United States Patent [19]
Norden

[11] 3,986,081
[45] Oct. 12, 1976

[54] PANEL FOR PLUG-IN CIRCUIT BREAKERS

[75] Inventor: Alexander R. Norden, New York, N.Y.

[73] Assignee: General Switch Corporation, North Bergen, N.J.

[22] Filed: Jan. 3, 1975

[21] Appl. No.: 538,343

[52] U.S. Cl. .............................. 317/119; 174/71 B
[51] Int. Cl.² ........................................... H02B 1/20
[58] Field of Search ........................ 317/118, 119; 339/198 N; 174/70 B, 71 B, 72 B, 99 B

[56] References Cited
UNITED STATES PATENTS

| | | | |
|---|---|---|---|
| 2,733,386 | 1/1956 | Myers | 317/119 |
| 2,738,473 | 3/1956 | Johnson | 317/119 |
| 2,837,699 | 6/1958 | Fore | 317/119 |
| 3,075,039 | 1/1963 | Kobryner | 174/71 B |
| 3,243,662 | 3/1966 | Ericson | 317/119 |
| 3,346,776 | 10/1967 | Olashaw | 174/99 B |
| 3,855,504 | 12/1974 | Olashaw | 317/120 |

Primary Examiner—Gerald P. Tolin
Attorney, Agent, or Firm—Harry Cohen

[57] ABSTRACT

There is disclosed a circuit breaker panel which is very compact, said panel comprising a panel board having a base, a bus bar support assembly mounted on said base, said support assembly having therein a plurality of separate bus bar receiving recesses arranged in alignment with each and perpendicular to said base, a bus bar in each of said recesses in alignment with each other and perpendicular to said base, and laterally spaced sets of terminals associated with said bus bars for electrical connection with a plurality of plug-in circuit breakers, respectively, said bus bars being disposed in the space between said terminals.

7 Claims, 4 Drawing Figures

PANEL FOR PLUG-IN CIRCUIT BREAKERS

BACKGROUND OF THE INVENTION

1. Field of the Invention

This invention relates to a new and improved mounting panel for the mounting of plug-in type circuit breakers.

2. Description of the Prior Art

Although a wide variety of mounting panels are known for the mounting of plug-in type circuit breakers, it may be understood that many of the same comprise first and second bus bars which are disposed in relatively widely spaced, side-by-side relationship, and which have contacts extending to only one side of each of said bus bars to thus result in unduly high space requirements, and the need for unduly large quantities of bus bar metal. Too, many of the circuit breaker mounting panels of the prior art do not provide for the disposition of an electrically insulating material between the spaced bus bars; are relatively difficult to assemble; and/or are not of particularly durable construction in that the support provided thereby for the bus bars is somewhat limited.

OBJECTS OF THE INVENTION

It is, accordingly, an object of this invention to provide a new and improved panel for plug-in circuit breakers which is of particularly compact configuration.

Another object of the invention is the provision of a panel as above which provides for maximum electrical insulation between the spaced bus bars which are included therein.

A further object of the invention is the provision of a panel as above which is of particularly strong construction, and one which is particularly easy to assemble.

SUMMARY OF THE DISCLOSURE

As disclosed herein, the mounting panel of the invention comprises a panel board having a generally planar base portion, and a bus bar support assembly which is mounted directly on said base portion. Said support assembly includes mounting spaces for an upper bus bar and a lower bus bar, and a wall of insulating material which separates said spaces. Upper and lower bus bars, having major portions of generally rectangular configuration, are spacedly mounted in said mounting spaces in generally aligned, edge-to-edge manner and are each generally perpendicular to said base portion. Each of said bus bars further includes a plurality of blade contacts which are engageable with terminals of the circuit breakers and which extend laterally from said major bus bar portions to form two rows of contacts which are disposed respectively in spaced relation at opposite sides of said support assembly, whereby the bus bars are located in the space between said blade contests.

DESCRIPTION OF THE DRAWINGS

The above and other objects and advantages of my invention are believed made clear by the following detailed description of the invention taken in conjunction with the accompanying drawings wherein.

DESCRIPTION OF THE INVENTION

Figure 1:
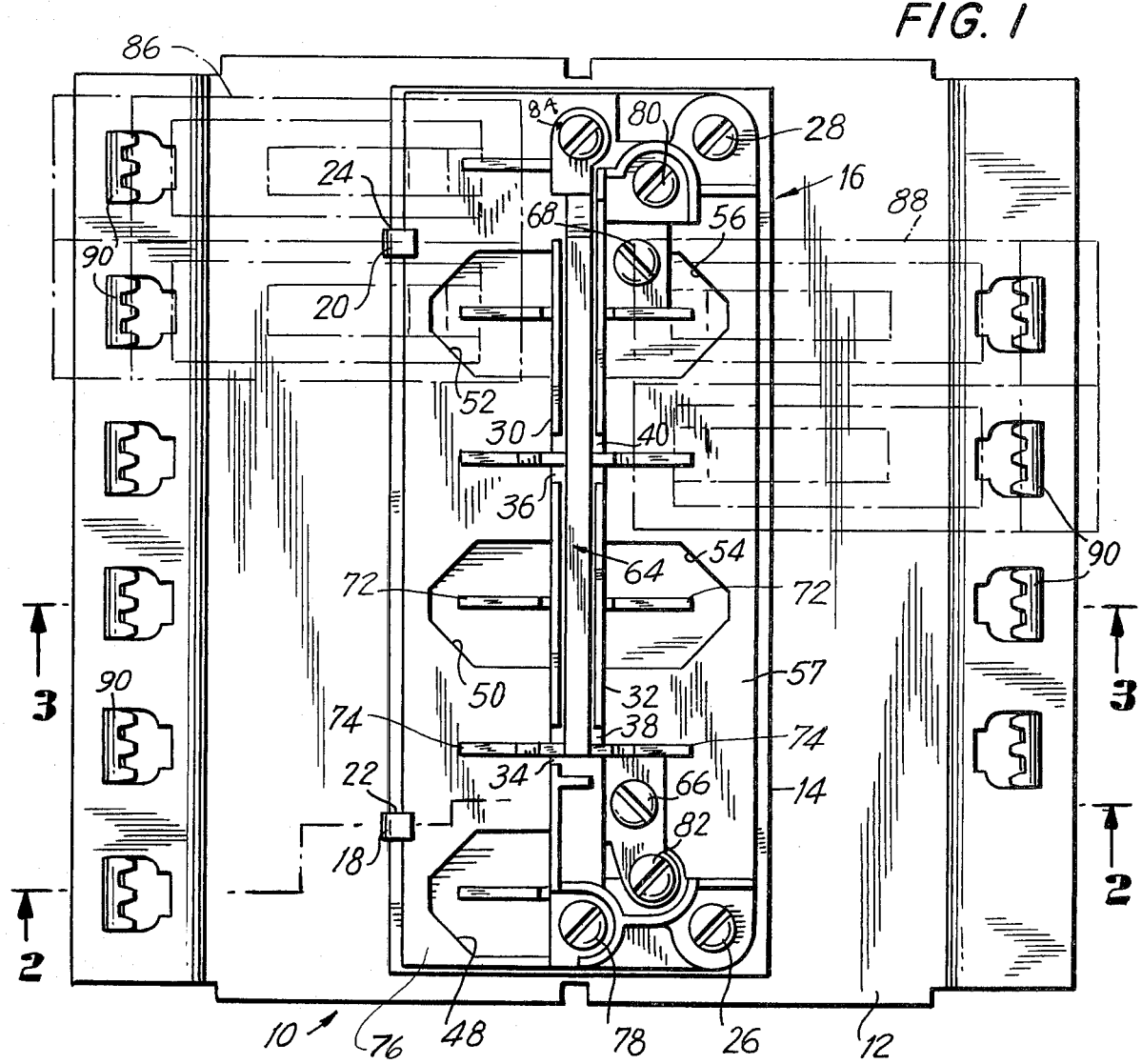
FIG. 1 is a top plan view, with additional parts in phantom for purposes of operational illustration, of a new and improved panel constructed and operative in accordance with the teachings of my invention.

Referring now to the drawings, a panel board is indicated generally at 10 and comprises a base 12 upon which is supported suitable insulation 14. A bus bar support assembly is indicated generally at 16 and is disposed as shown directly atop the insulation 14 on base 12 to overlie the former. The assembly 16 is made from any suitable electrical insulative material in the nature of a readily moldable plastic, and is fixedly secured to base 12 by prongs 18 and 20 which extend from the latter into complementary shaped notches 22 and 24 which are formed as shown in the left-most edge of support assembly 16 as best seen in FIG. 1. Locating screws 26 and 28 extend as shown through spaced bores provided therefore adjacent the right-most edge of support assembly 16 into non-illustrated locating holes provided in base 12 to fixedly locate the support assembly 16 atop the base by forcing the former firmly against the prongs 18 and 20.

Figure 2:
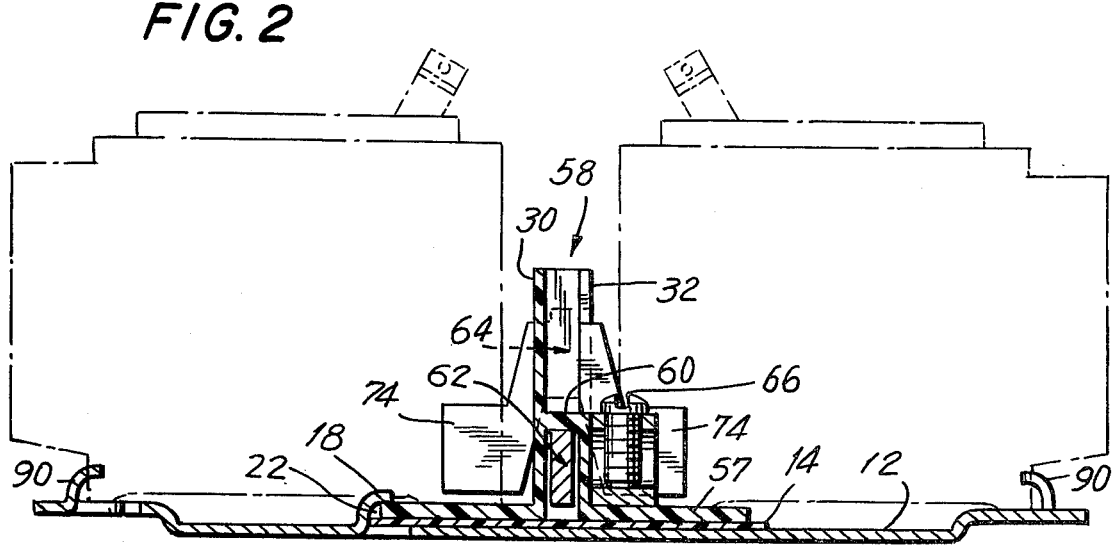
FIG. 2 is a vertical cross-sectional view, with parts broken away for purposes of illustration taken along line 2—2 in FIG. 1.
Figure 3:
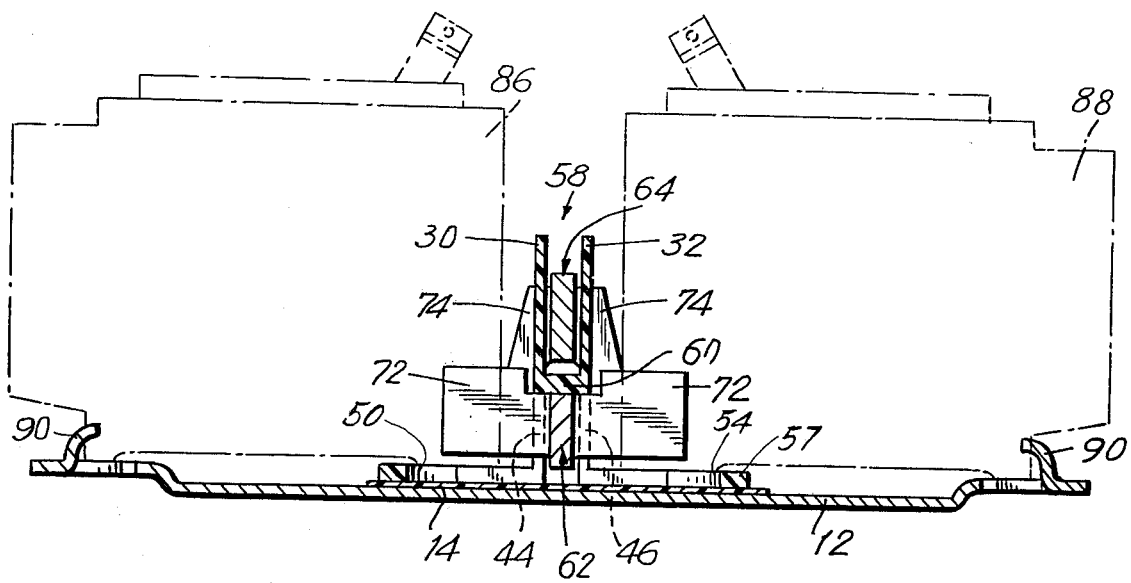
FIG. 3 is a vertical cross-sectional view taken along line 3—3 in FIG. 1.
Figure 4:
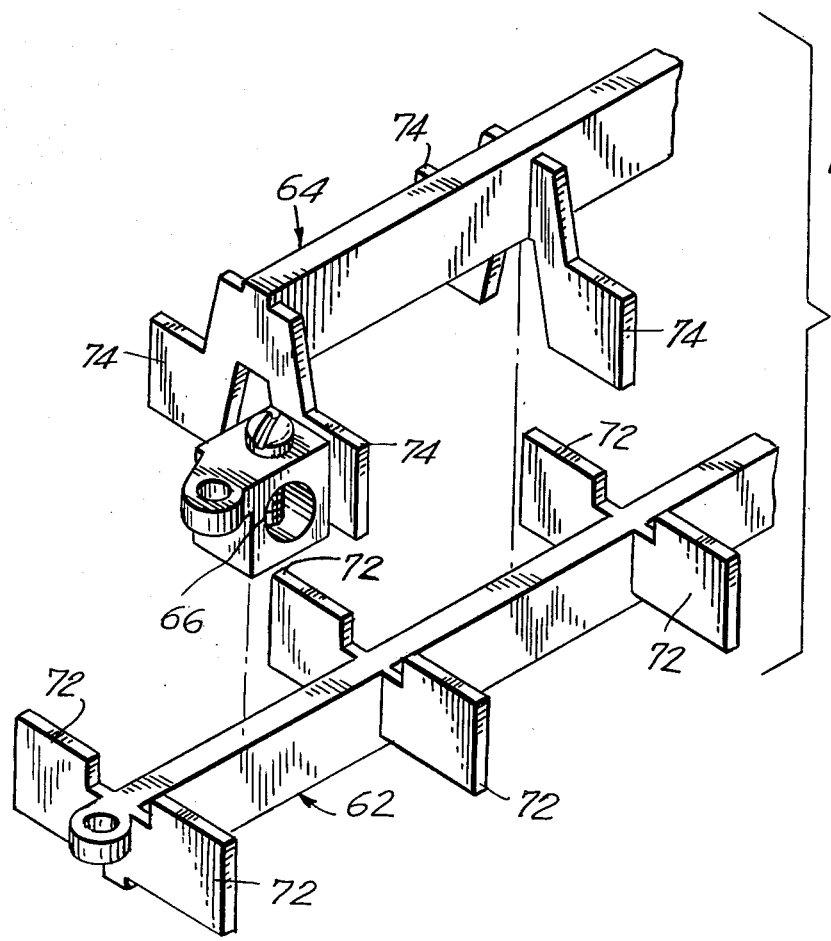
FIG. 4 is an exploded perspective view of parts of the bus bars.

Notches 34 and 36 are formed in wall 30 to extend downwardly from the upper edge thereof. In like manner, notches 38 and 40 are formed in wall 32 to extend downwardly from the upper edge thereof. As best seen in FIG. 3, notches 44 and 46 are formed to extend upwardly from the lower edges of walls 30 and 32, respectively. Cut-outs 48, 50, 52, 54, and 56 are provided as shown in the bus bar assembly base 57 as shown by FIG. 1. The generally longitudinally extending bus bar mounting space formed between spaced walls 30 and 32 is indicated at 58, and the same is divided into upper and lower vertically aligned bus bar receiving recesses by generally longitudinally extending support assembly dividing wall 60 which is best seen in FIGS. 2 and 3, said recesses are perpendicular to base 12.

A lower bus bar is indicated at 62, and an upper bus bar is indicated at 64, and each of said bus bars comprises a central or major portion which is preferably of generally rectangular cross section, the opposite sides of said bus bars being perpendicular to base 12. Said bus bars include terminal connectors 66 and 68 for connection to a source of electricity.

Lower bus bar 62 comprises a plurality of spaced generally parallel terminal blade contacts 72 which extend laterally from the bus bar at opposite sides thereof, respectively. The upper bus bar has similar laterally extending terminal blade contacts 74 which extend laterally thereof, passing through notches 34, 36 and 38, 40 in side walls 30 and 32, respectively.

Lower bus bar 62 is mounted in the bus bar support assembly 16 prior to the attachment of the latter to the panel board 10, and this mounting is effected by the insertion of the bus bar from the bottom of the assembly into the recess between the lower parts of side walls 30 and 32 of the generally longitudinally extending space 58, with the blade contacts 72 being respectively free to pass into the relevant notches formed in walls 30 and 32 and through the cut-outs 48, 50, 54, 56 and 52 which are formed in the base portion 76 of the bus bar support assembly 16 to bring the lower bus bar to the position thereof depicted in the drawings. Following such insertion, the lower bus bar 62 is secured to the bus bar mounting assembly 16 by means of attachment screws 78 and 80 which extend therethrough.

Upper bus bar 64 is mounted in bus bar assembly 16 by simply inserting the bus bar from the top into the upper portion of space 58 with the bus bar blade contacts being free to pass into the relevant notches in walls 30 and 32 and with the lower edge of the bus bar coming to rest against the upper edge of support assembly dividing wall 60; and such insertion may be effected before or after the support assembly 16 is secured to the panel board. Upper bus bar 64 is then secured to the assembly 16 by attachment screws 82 and 84 which extend therethrough. With the respective bus bars 62 and 64 inserted as described in the bus bar support assembly 16, it is believed clear that each of said bus bars will be perpendicular to base 12.

By the above description is believed made clear that the novel teaching of the generally aligned, vertical edge-to-edge bus bar mounting features of the invention, the bus bars being perpendicular to the base 10 and positioned in the space between the terminal contact members provide for an extremely compact bus bar arrangement, while maintaining and in some respects increasing the requisite electrical insulation between the respective upper and lower bus bars. In this connection, it is to be noted that the major portions of the bus bars are separated from the other, and, in each instance, from the blade contacts of the other, by the separating wall 60 and the walls 30 and 32 respectively rather than just by an air space as is prevalent in the prior art.

Further, the extension as described of blade contacts to both sides of each of the bus bars, and the interleaving of said contacts also contributes to the overall compactness of the mounting panel. Too, it is believed clear that the substantial measure of support provided for the bus bars by the bus bar support assembly 16 of the invention will result in a mounting panel which is substantially stronger than many of those of the prior art. In addition, it may be understood that assembly of the mounting panel of the invention is relatively easy task in that the same requires only the insertion of the lower and upper bus bars into the support assembly and the tightening of the four attachment screws.

It is, of course, to be clearly understood that the terms "vertical" and/or "upstanding" and "upwardly extending" or the like as used in this specification presume the generally horizontal and upward facing disposition of the panel board 10 and have been used for purposes of convenience and clarity of description in accordance with the respective panel board and support assembly orientation as depicted in the drawings; it being presumed to be clearly understood by those skilled in this art that the panel board and bus bar support assembly may, of course, be disposed and faced other than horizontally and upwardly, respectively.

for operational use of the new and improved panel of the invention, it may be understood that one circuit breaker of the plug-in type is operatively mounted thereon in electrical connection with each of the blade contacts, and two such breakers are depicted in phantom at 86 and 88, respectively, in FIGS. 1, 2 and 3. Each of said breakers may, for example, take the form of that disclosed in my U.S. Pat. No. 3,818,168. A mounting prong for mechanical support of the lower rear surface of the breaker in conventional manner is provided in the panel board base 12 opposite each blade contact, and such prongs are identified, as for example, at 90. Mounting and de-mounting of the respective breakers on the panel is accomplished in conventional manner.

Panels of the prior art over which the panel of the invention is believed to represent a significant improvement, primarily because of the compactness referred to above, are examplified by those disclosed in U.S. Pat. Nos. 3,287,607 and 3,808,507, and 3,611,048.

Various changes may, of course, be made in the disclosed embodiment of my invention without departing from the spirit and scope thereof as defined in the appended claims. As panels for plug-in circuit breakers and such breakers are both well known and since the panel of the present invention may be used with such breakers of various types and constructions, only the panel is claimed herein.

What is claimed is:

1. A circuit breaker panel comprising, a panel board having a base, a bus bar support assembly mounted directly on said base, said support assembly having therein a plurality of separate bus bar receiving recesses in alignment with each other, said recesses being bordered by laterally spaced side walls perpendicular to said base, and a bus bar disposed in each of said recesses between said side walls, respectively, each of said bus bars having opposite surfaces which are wider than the bus bar edges and are perpendicular to said base and have laterally spaced sets of terminals for engagement by plug-in terminals of a plurality of plug-in circuit breakers, respectfully, said bus bars being disposed in the space between said terminals.

2. A circuit breaker panel as in claim 1, wherein said bus bar support assembly comprises a molded insulation member having an integral part between said recesses for electrically insulating said bus bars from each other.

3. A circuit breaker panel as in claim 1, wherein at least one of said bus bars has terminals disposed at opposite sides of said recess in which said one of the bus bars is disposed.

4. A circuit breaker panel as in claim 1, wherein said bus bars are positioned by said spaced side walls bordering said recesses, respectively.

5. A circuit breaker panel as in claim 2, wherein one of said bus bars is insulated from said base by insulation disposed between said base and said bus bars support assembly.

6. A circuit breaker panel as in claim 1, wherein said bus bars have lateral extensions providing terminals adapted to be electrically and physically connected to a plurality of plug-in circuit breakers, respectively.

7. A circuit breaker panel as in claim 2, wherein said bus bars have terminals extending laterally therefrom externally of said recesses for engagement with terminals of a plurality of circuit breakers, respectively.

* * * * *